US012590601B1

(12) United States Patent
Mantovani

(10) Patent No.: US 12,590,601 B1
(45) Date of Patent: Mar. 31, 2026

(54) MATTRESS SUPPORT ASSEMBLY

(71) Applicant: ITABOX INDÚSTRIA E COMÉRCIO DE MÓVEIS DE MADEIRA LTDA., Itapetininga (BR)

(72) Inventor: Hederson Camargo Mantovani, São Paulo (BR)

(73) Assignee: ITABOX INDÚSTRIA E COMÉRCIO DE MÓVEIS DE MADEIRA LTDA., Itapetininga (BR)

( * ) Notice: Subject to any disclaimer, the term of this patent is extended or adjusted under 35 U.S.C. 154(b) by 0 days.

(21) Appl. No.: 19/177,123

(22) Filed: Apr. 11, 2025

(51) Int. Cl.
*F16B 12/56* (2006.01)
*A47C 19/02* (2006.01)
*F16B 12/14* (2006.01)

(52) U.S. Cl.
CPC ............ *F16B 12/56* (2013.01); *A47C 19/022* (2013.01); *A47C 19/024* (2013.01); *F16B 2012/145* (2013.01)

(58) Field of Classification Search
CPC .... F16B 12/56; F16B 2012/145; F16B 12/54; A47C 19/024; A47C 19/022; A47C 19/021; A47C 19/005
See application file for complete search history.

(56) References Cited

U.S. PATENT DOCUMENTS

| | | | | |
|---|---|---|---|---|
| 835,582 | A | * | 11/1906 | Tobey ..................... A47B 87/02 |
| | | | | 5/310 |
| 2,567,619 | A | * | 9/1951 | Rosenfeld ............ A47C 19/024 |
| | | | | 280/659 |
| 3,031,689 | A | * | 5/1962 | Sark ...................... A47C 19/022 |
| | | | | 248/188.4 |
| 3,195,196 | A | * | 7/1965 | Carisi ..................... F16B 12/44 |
| | | | | 403/219 |
| 3,443,530 | A | * | 5/1969 | Carlson ................ A47B 13/021 |
| | | | | 248/188.91 |
| 3,638,803 | A | * | 2/1972 | MacMillan ........ A47B 47/0008 |
| | | | | 108/159 |
| 4,870,711 | A | * | 10/1989 | Felix ..................... A47C 19/005 |
| | | | | 403/205 |
| 5,709,500 | A | | 1/1998 | Mizelle et al. |
| 11,083,306 | B1 | * | 8/2021 | Thompson ........... A47C 31/023 |

(Continued)

FOREIGN PATENT DOCUMENTS

| | | | | |
|---|---|---|---|---|
| BR | 202016002601 | U2 | 8/2017 | |
| BR | 202018075946 | U2 | 6/2020 | |
| KR | 102605623 | B1 | * 11/2023 | ............. A47B 96/14 |

*Primary Examiner* — Matthew Troutman
*Assistant Examiner* — Alison N Labarge
(74) *Attorney, Agent, or Firm* — The Webb Law Firm

(57) ABSTRACT

A mattress support assembly includes a rectangular frame having side rails and footboard and headboard rails; a connector assembly in each corner of the frame internally connecting each side rail to the footboard rail and to the headboard rail; a leg disposed under each corner of the frame, each leg having three bars in a Cartesian arrangement, with an angle of 90° in the horizontal plane being defined between a first bar and a second bar, while a third bar projects in the orthogonal direction to the horizontal plane, each of the first bar and the second bar having a threaded pin, and each threaded pin projecting orthogonally in relation to the horizontal plane and in the opposite direction in relation to the third bar.

5 Claims, 4 Drawing Sheets

(56)            References Cited

U.S. PATENT DOCUMENTS

| | | | |
|---|---|---|---|
| 2008/0078022 A1* | 4/2008 | Wecker | A47C 19/025 |
| | | | 5/310 |
| 2018/0045235 A1 | 2/2018 | Oh | |
| 2019/0021508 A1* | 1/2019 | Jewett | A47C 19/005 |
| 2020/0049183 A1* | 2/2020 | Zerillo | A47C 19/005 |
| 2024/0049890 A1 | 2/2024 | Mantovani | |

\* cited by examiner

MATTRESS SUPPORT ASSEMBLY

BACKGROUND OF THE INVENTION

Field of the Invention

The present invention refers to a box-type bed, and more particularly to a box-type bed able to be easily and quickly assembled, even by inexperienced users. In particular, the invention relates to a box-type bed that is easy to assemble and has improved fastening between the side rails and the end parts (headboard and footboard) of the bed, the side rails and the end parts being further fastened by a leg assembly. More particularly, the leg assembly further allows the installation of a support structure for a bed headboard.

Description of Related Art

As known in the art, sommier box, or simply box-type beds, are support structures for a mattress that is arranged above it and, usually, without the presence of edges or side structures partially or completely involving the mattress.

The reduced size of the box, compared to traditional beds equipped with a bed headboard, footboard and pronounced sides, makes the box particularly suitable for a more agile and simple production, in addition to allowing less bulky and costly transport. A greater rationalization in the logistics of box-type beds can also be obtained by delivering them in disassembled form, which substantially reduces the transported volume, but which entails the need for assembly at the place of delivery/use, usually by a furniture fitter hired by the seller or the manufacturer.

The pinnacle of logistical efficiency, as can be easily inferred, is the possibility that the buyer, even with no experience in assembling furniture and the like, and potentially without basic tools, is able to receive the packed box-type bed and can, quickly, easily and without mistakes, assemble it immediately upon receipt of the bed in disassembled condition.

However, due to the quick DIY (Do It Yourself) assembly feature, in addition to the fact that the bed frame is made of wood, consumers often complain about the lack of structural rigidity of the bed. Obviously, for the user, any type of play in the horizontal plane causes a feeling of insecurity, leading to a loss of confidence in the structural integrity of the bed. In general, the culprits for this type of improper movement in the horizontal plane are due to the characteristics of the coupling assemblies that join the side rails to the end parts (headboard and footboard) of the bed, and the characteristics of the bed legs that support the bed frame, among others. In addition, when the bed begins to allow a certain amount of play in the horizontal plane, the mechanical stresses on the fixing screws of the various components fixed to the wooden frame increase exponentially. As a result, the holes in the frame that receive the fixing screws begin to strip, further increasing the play of the frame and the feeling of insecurity of the user.

The document BR 202018075946-4 illustrates a box-type bed formed by a base defined by the integration of two side spars, a set of central crossbeams, two outer crossbeams, a set of cover slats and a set of support legs. The base of the bed is assembled, or disassembled, by coupling and fixing its components together, specifically by penetrating the ends of the crossbeams into the space defined by the spars, with the final fastening being done using nuts and screws so to integrate the resulting structure. Despite the simplification obtained, the assembly of this box-type bed still requires a certain degree of skill on the part of the furniture fitter, in addition to the use of some tools, even if they are basic.

The document BR 202016002601-1 illustrates a box-type bed for easy assembly or disassembly, wherein three spars having front and rear recesses, in addition to a pair of holes, are provided. The front and rear crossbeams presumably have integrated screws that penetrate the respective holes of the spars and can be screwed in after coupling. After assembling the base frame, the bed frame is extended over it, as it is defined by rigid transverse elements and interconnected by flexible straps. The three spars of the base frame have projections designed to keep the bed frame in its final position. Despite this solution to envisage an easy assembly of the box-type bed, the need to fix the spars with screws on the two crossbeams can lead an inexperienced user to overtighten, or not enough, the nuts on the screw threads, thus compromising the assembly of the box-type bed structure.

The document US20240049890 A1 illustrates a quick assembly box-type bed, comprising a rectangular frame defined by side rails arranged in parallel and interconnected to end panels also arranged in parallel; said end panels have couplings on the inside and at opposite ends; said side rails have couplings on the inside and at opposite ends, and the upper face of each side rail has a step shape in the lower plane of which it is fixed a Velcro strip; and said couplings being defined by plates from which eyelets project spaced apart, said eyelets being able to receive a pin intended to penetrate all the central holes of the eyelets, such pin being held in position by means of a cotter pin; and further comprising bipartite bed frames defined by a series of equidistant slats joined by Velcro strips, wherein the position of each Velcro strip corresponds to the position of the respective Velcro strip of said side rails. Despite the advantages of this box-type bed, use over a certain period of time may lead to partial loosening of the screws that secure the side rails and end parts, thus compromising the structural rigidity of the bed frame.

The document U.S. Pat. No. 11,083,306 discloses a bed set comprising a connector assembly and a stabilizer assembly at each corner of the product for joining perpendicular first and second trusses. Each stabilizer assembly comprises a first bracket secured to the first truss, a second bracket secured to the second truss and a leg assembly comprising a lag and a threaded rod. One of the first and second brackets has a threaded boss and the other of the first and second brackets has an opening aligned with the threaded boss. The threaded rod extends through the aligned threaded boss and opening of the first and second brackets and the leg abuts the lower bracket to support the foundation above the ground. According to the proposed set, only the lower support supports the bed, which could lead to its deformation with continued use of the bed. Furthermore, the illustrated set does not allow for easy assembly of a headboard to the bed, as no fixing points for a headboard are provided.

The document US 2018/0045235 discloses a connecting structure of a bed frame. The bed frame includes a frame, bed legs, and a bed plank support frame. Two side boards of the frame are provided with a plurality of support portions, respectively. One end of each of a plurality of support members of the bed plank support frame is connected to a corresponding one of the support portions of the side boards. Another end of each of the plurality of support members is connected to a corresponding one of support boards of the connecting spine. The connecting spine is designed as a 4-shaped structure, and the upright board is integrally formed with the support boards so that one end of each of the plurality of support members can be directly attached to the corresponding support board of the connecting spine, providing a simple structure and a stable support.

The document U.S. Pat. No. 5,709,500 discloses a connector assembly for connecting components of knockdown furniture including two connector blocks which are rigidly mountable on the furniture components, and a tapered pin which interconnects the two connector blocks. Each connector block includes parallel tabs which are rigidly supported on a base plate in spaced apart relation. The tabs of each connector block are positioned in the spaces between the tabs of the other connector block. Each tab has a tapered pin-receiving opening which is aligned with the openings of the other tabs. The transverse dimensions of these openings decrease progressively from one tab to another. The tapered pin extends through the pin-receiving openings and it frictionally engages the tabs with sufficient friction to prevent movement of the tapered pin relative to both connector blocks. The tabs of each connector block have edges which abut the base of the other connector block and are shaped to prevent relative pivoting movement between the connector blocks.

A first objective of the present solution is therefore to provide a box-type bed that can be assembled or disassembled locally, without the need for tools, with a minimum of specific training from the assembler, and that can eliminate or substantially reduce any type of play or clearance in the horizontal plane.

A second objective of the invention is to provide a bed leg assembly that can act both to support the bed frame and to assist in the relative fixation between the side rails and end parts that define the frame of the box-type bed.

A third objective of the invention is to provide a box-type bed whose structure of the leg assemblies includes a support for installation of a headboard.

SUMMARY OF THE INVENTION

These and other objectives are achieved using a box-type bed, comprising:
- a rectangular frame having side rails and footboard and headboard rails;
- a connector assembly in each corner of the frame internally connecting each side rail to the footboard rail and to the headboard rail, said connector assembly in turn comprising:
  - two plates from which alternately insertable eyelets project, each plate being fixed to an footboard rail/ headboard rail or to a side rail by means of screws;
  - a conical pin that penetrates the inside of the alternately inserted eyelets, with the lower end of the conical pin having an external thread which receives a locking nut; wherein each of the plates has an inclined face having an angle of inclination of 45° in relation to the flat surface of the plate;
- a leg disposed under each corner of the frame, each leg having three bars in a Cartesian arrangement, with an angle of 90° in the horizontal plane being defined between a first bar and a second bar, while a third bar projects in the orthogonal direction to the horizontal plane, each of the first bar and the second bar having a threaded pin, and each threaded pin projecting orthogonally in relation to the horizontal plane and in the opposite direction in relation to the third bar; and
- a reinforcement plate fixed to the first bar and the third bar, with the reinforcement plate being fixed to the second bar and the third bar, each reinforcement plate having the shape of a right triangle, with the edge opposite the right angle having an arched shape.

In an embodiment, a box-type bed further comprises a headboard having a headboard frame with two legs, wherein the headboard is fixed to the bed frame, with adjustable clearance, by means of a bracket, and wherein the bracket is an L-shaped board consisting of a base and a fixing plate, the base being fixed between the bed frame and the leg.

BRIEF DESCRIPTION OF THE DRAWINGS

The subject matter of the invention will be better understood from the detailed description that follows, which is made with the support of the attached illustrative and non-limiting figures, in which.

DESCRIPTION OF THE INVENTION

Before the invention is described in detail, it should be understood that the description is not limited to the specific component parts of the bed described, since such components may vary. It should also be understood that the terminology used herein is for the purpose of describing particular embodiments only and is not intended to be limiting. It should be noted that, as used in the specification and appended claims, the singular forms "a", "an" and "the" include singular and/or plural referents, unless the context clearly indicates otherwise. Furthermore, it should be understood that, in case of parameter ranges delimited by numerical values being provided, the ranges are deemed to include such limiting values. References to the horizontal and vertical planes refer to the bed in its assembled and in-use condition. Moreover, other than in any operating examples, or where otherwise indicated, all numbers expressing, for example, values of parameters used in the specification and claims are to be understood as being modified in all instances by the term "about".

The present invention is an improvement over the Quick-Assembly Bed Base, an invention by the same inventor, as described in U.S. patent application No. 20240049890 A1, which is incorporated herein in its entirety by reference.

Figure 1:
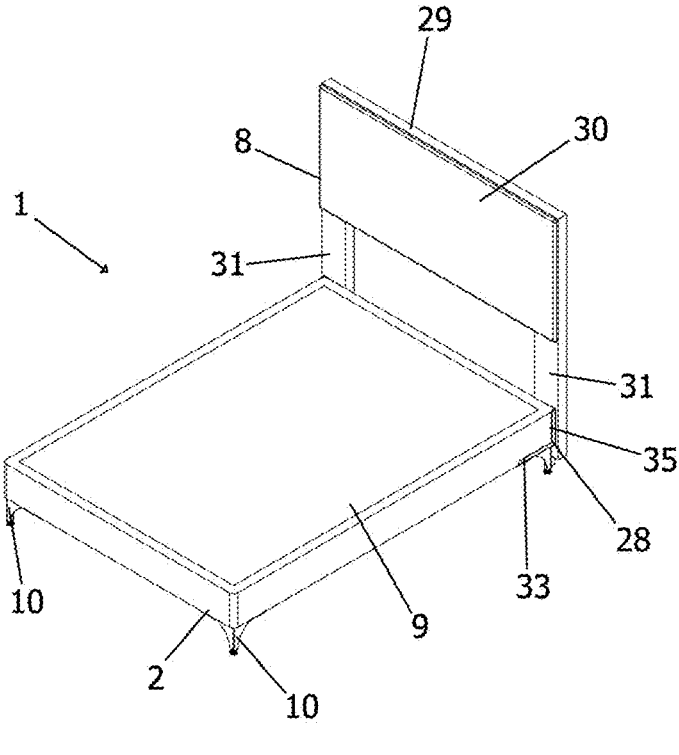
FIG. 1 is a perspective view of a box-type bed according to the invention.

As illustrated in FIG. 1, numeral 1 indicates, as a whole, a box-type bed in a double bed configuration. However, it should be understood that the principles of the invention can also be applied to other bed sizes, for example single bed, Queen Size, King Size, Full Size or others, without departing from the scope of protection of the present invention. Alternatively, the bed 1 also comprises a headboard 8, which is fixed to a frame 2, at least partially surrounded by a protective cover 9.

Figure 2:
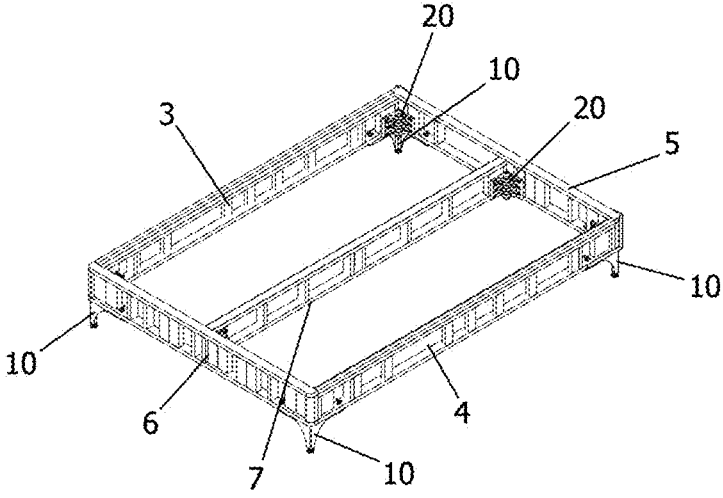
FIG. 2 is a perspective view of the bed frame in FIG. 1.

As seen in FIG. 2, the frame 2 of the bed 1 has a quadrangular shape, formed by the union of two side rails 3 and 4, equal to each other and which are fixed by an end rail, such as a headboard rail 5 or a footboard rail 6. A center rail 7 is arranged so as to join the central portion of the headboard rail 5 to the central portion of the footboard rail 6. In an embodiment not illustrated, the center rail 7 is not provided. In an embodiment not illustrated, two center rails 7 are provided, parallel and equidistant from each other and equidistant in relation to the side panels 3, 4 for the cases of a very wide bed, such as a King Size or Cal King Size model bed.

In addition, said frame is arranged on a plurality of legs 10, which are fixed under each of the corners of the frame 2. In particular, each leg 10 is fixed under a respective corner at which a side rail 3, 4 is joined to an end rail 5, 6. In one embodiment, a leg 10 is fixed in the region where the center rail 7 joins each of the end rails 5, 6.

Figure 3:
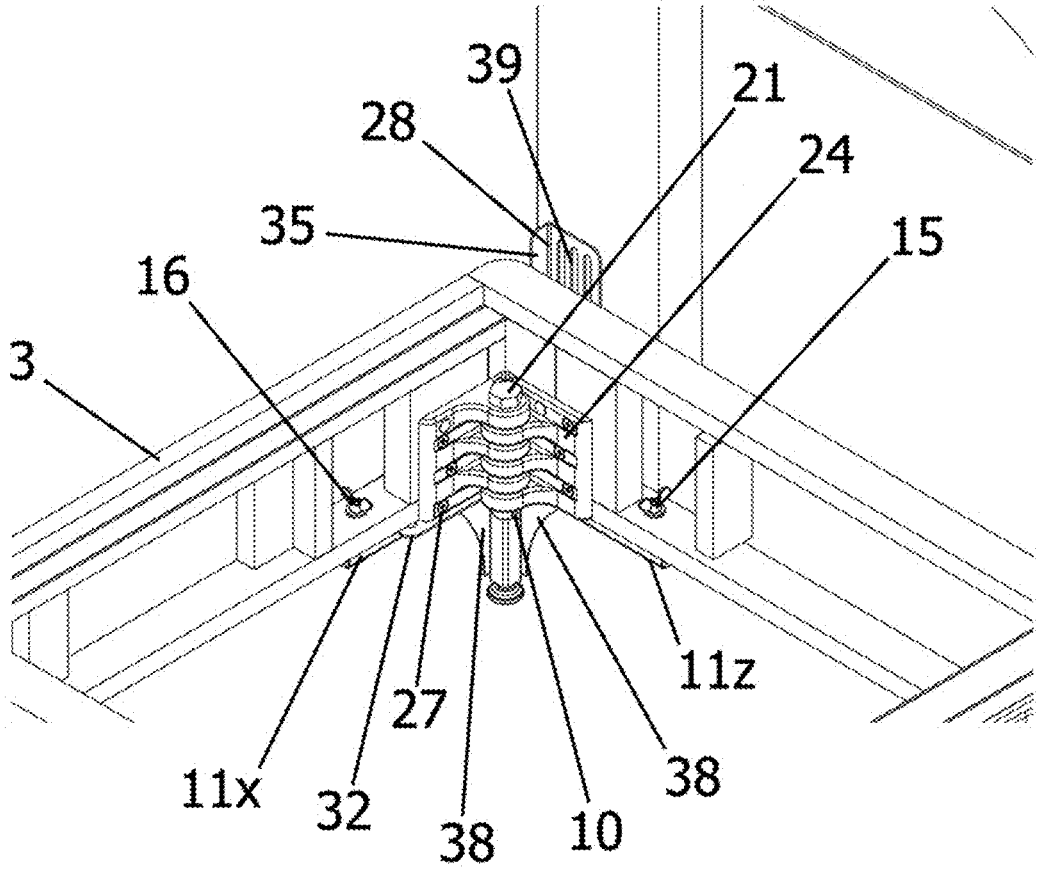
FIG. 3 is an enlarged perspective detail view of a corner of the frame, at the junction of the side rail with the headboard rail.
Figure 4:
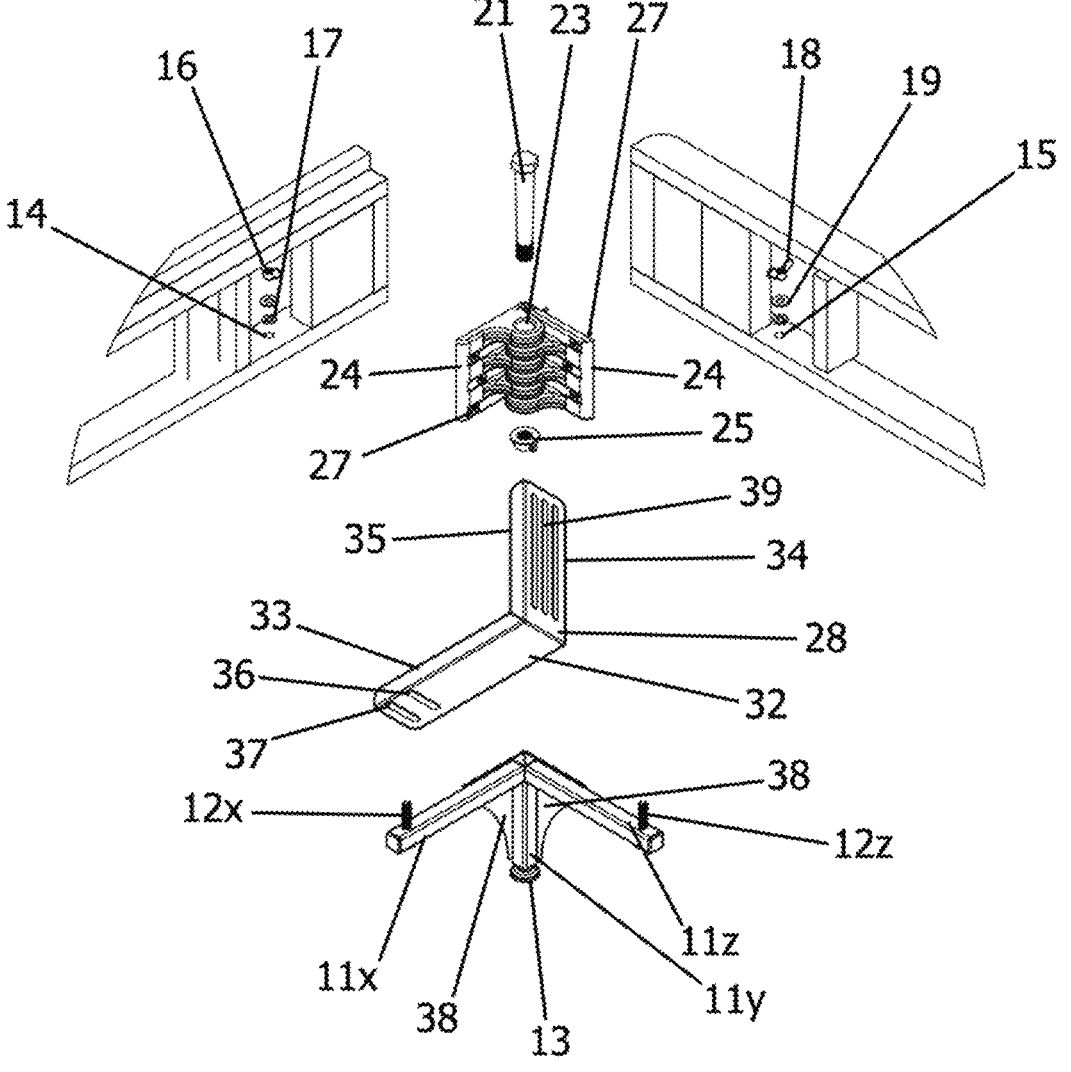
FIG. 4 is an exploded perspective view of FIG. 3.

FIGS. 3 and 4 illustrate, in an enlarged form, the corner of the frame 2 defined by the union between the side rail 3 and the headboard rail 5. The leg 10 is a structure composed of three bars 11 in a Cartesian arrangement. More particularly, a first bar 11x and a second bar 11z define between them an angle of 90° in horizontal plane, while a third bar 11y projects in direction orthogonal to the horizontal plane. Preferably, each of the first, second and third bars 11x, 11y and 11z has a square cross-section. Each of the first 11x and second 11z bars further comprises a threaded pin 12x, 12z, which projects orthogonally with respect to the horizontal plane and in the opposite direction with respect to the third bar 11y. In one embodiment, each of the first 11x and second 11z bars has a length of at least 15 cm (5.91"). More preferably, each of the first 11x and second 11z bars has a length of 19 cm (7.48").

In one embodiment, the lower end of the third bar 11y comprises a thread-adjustable shoe 13, allowing a height adjustment of each leg 10 so as to compensate for any misalignment of the floor on which the bed 1 is placed.

Furthermore, between bars 11x and 11y a reinforcement tab 38 is fixed, in the shape of a right triangle, with the edge opposite the right angle having an arched shape. Similarly, between bars 11z and 11y a reinforcement tab 38 is fixed, in the shape of a right triangle, with the edge opposite the right angle having an arched shape. Preferably, the bars 11x, 11y, 11z and the reinforcement tabs 38 are metal elements, the reinforcement tabs 38 being welded to the respective bars mentioned. In this way, each leg 10 is extremely rigid and able to maintain the structural rigidity of the frame 2.

For this purpose, each of the side rails 3, 4 has respective through holes 14 through which the threaded pin 12x penetrates and is fixed by a wing nut 16 on washers 17. Similarly, each of the end rails 5, 6 has respective through holes 14 in which the threaded pin 12x penetrates and is fixed by a wing nut 18 on washers 19. In this way, each leg 10 supports both a side rail and an end rail and secures these rails in the final assembled position of the frame 2 of the bed 1.

As seen in FIGS. 1, 3 and 4, the box-type bed 1 also comprises a headboard 8 which is fixed to the frame 2, having adjustable spacing by means of a bracket 28. The headboard 8 comprises a headboard frame 29 on which a plate 30 is fixed which acts as a backrest for users. The front face of said plate 30 of the headboard 8 may be flat and smooth, embossed, colored or decorated. From the plate 30, two legs 31 project downwards, i.e. towards the frame 2, which are fixed to the bed 1 by means of brackets 28.

The bracket 28 is an L-shaped metal plate comprising a base 32 having a first side tab 33. A fixing plate 34 projects upwards, i.e. towards the plate 30 of the headboard 8, at 90° in relation to the base 32, and has a second side tab 35, which is a continuation of the first side flap 33. In the assembled condition, the first side tab 33 remains abutted on the external face of the side rail 3, 4 of the frame 2. The fixing plate 34 has several longitudinal slots 39 parallel to each other, which allow the fixing of a leg 31 by means of screws or any other appropriate means.

The base 32 presents, close to its free end, at least one pair of transverse slots 36, 37. Each of the slots 36, 37 defines an adjustable position for fixing the headboard 8 in relation to the frame 2. Specifically, and during assembly, the base 32 of the bracket 28 is interposed between the bar 11x of the leg 10 and the side rail 3, so that the threaded pin 12 passes through the base 32 through the proximal slot 36 (in relation to the vertex of the bracket 28) or through the distal slot 37. When the threaded pin 12 passes through the proximal slot 36, the headboard 8 is arranged against the frame 2, that is, abutted on the headboard rail 5. In a different way, when the threaded pin 12 passes through the distal slot 37, the headboard 8 is arranged away from the frame 2. In this way, the slots 36, 37 allow the user to adjust the distance between the frame 2 and the headboard 8, according to his/her preference or the characteristics of the room in which the bed 1 will be used.

As seen in FIGS. 3, 4, 5 and 6, each side rail 3, 4 is also joined to an end rail 5, 6 by means of a coupling 20. Each coupling 20 has a general shape similar to a hinge, that is, composed of two plates 24 from which eyelets 23 project, said eyelets having equivalent thickness and being alternately interlockable. Each plate 24 is fixed to an end rail 5, 6 or to a side rail 3, 4 by means of at least three screws 27.

The fixation between two couplings 20 is made by means of a slightly conical pin 21, which penetrates all the central holes of the eyelets 23. The lower end of the conical pin 21 has an external thread 22 which receives a locking nut 25. Thus, after the pin 21 is inserted into the coupling 20 through the eyelets 23, the locking nut 25 is screwed onto the external thread 22 forcing the conical pin 21 against the internal walls of the eyelets 23.

Figure 5:
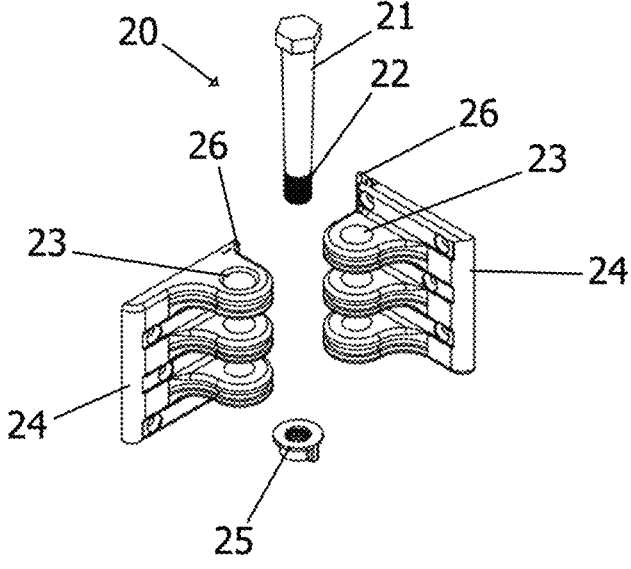
FIG. 5 is an exploded perspective view of the coupling assembly.
Figure 6:
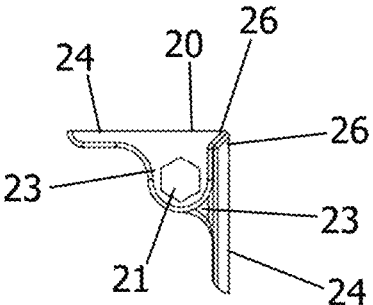
FIG. 6 is a top elevation view of the coupling assembly in the assembled condition.

As seen in FIGS. 5 and 6, each of the plates 24 has an inclined surface 26, having an inclination angle of 45° in relation to the flat surfaces of the plates 24, so that, in the assembled position (see specifically FIG. 6), each of the inclined faces is in direct contact with the complementary inclined face. Thus, the direct contact between the inclined surfaces 26 of the plates 24 actively and additively contributes to keeping each of the plates 24 at right angle (90°) to the complementary plate 24.

EMBODIMENTS

1. A box-type bed, comprising:

a rectangular frame having side rails and footboard and headboard rails;

a connector assembly in each corner of the frame internally connecting each side rail to the footboard rail and to the headboard rail, said connector assembly in turn comprising:

two plates from which alternately insertable eyelets project, each plate being fixed to an footboard rail/headboard rail or to a side rail by means of screws;

a conical pin that penetrates the inside of the alternately inserted eyelets, the lower end of the conical pin has an external thread which receives a locking nut;

each of the plates has an inclined face having an angle of inclination of 45° in relation to the flat surface of the plate;

a leg disposed under each corner of the frame, each leg having three bars in a Cartesian arrangement, with an angle of 90° in the horizontal plane being defined between a first bar and a second bar, while a third bar projects in the orthogonal direction to the horizontal plane, each of the first bar and the second bar having a threaded pin, and each threaded pin projecting orthogonally in relation to the horizontal plane and in the opposite direction in relation to the third bar; and a reinforcement plate fixed to the first bar and the third bar, with the reinforcement plate being fixed to the second bar and the third bar, each reinforcement plate having the shape of a right triangle, with the edge opposite the right angle having an arched shape.

2. The box-type bed of embodiment 1, wherein each of the first, second and third bars has a square cross-section.

3. The box-type bed of embodiment 1, wherein the lower end of the third bar further comprises a screw-adjustable shoe.

4. The box-type bed of embodiment 1, wherein each of the first, second and third bars and the reinforcement tabs are metal elements, a reinforcement tab being welded to the first bar and the third bar and another reinforcement bar being welded to the second bar and the third bar.

5. The box-type bed of embodiment 1, wherein each of the first and second bars has a length of at least 15 cm (5.91"), and preferably 19 cm (7.48").

6. The box-type bed of embodiment 1, further comprising at least one center rail joining the central portion of the headboard rail and the central portion of the footboard rail, there being one leg on the joining of the center rail with the central portion of the headboard rail, and one leg on the joining of the center rail with the central portion of the footboard rail.

7. A box-type bed, comprising:

a rectangular frame having side rails and footboard and headboard rails;

a connector assembly in each corner of the frame internally connecting each side rail to the footboard rail and to the headboard rail;

a leg disposed under each corner of the frame, each leg having three bars in a Cartesian arrangement, with an angle of 90° in the horizontal plane being defined between a first bar and a second bar, while a third bar projects in the orthogonal direction to the horizontal plane, each of the first bar and the second bar having a threaded pin, and each threaded pin projecting orthogonally in relation to the horizontal plane and in the opposite direction in relation to the third bar;

a headboard having a headboard frame with two legs, the headboard is fixed to the bed frame, with adjustable clearance, by means of a bracket, and the bracket is an L-shaped board consisting of a base and a fixing plate, the base being fixed between the bed frame and the leg.

8. The box-type bed of embodiment 7, wherein the base has at least two transverse slots, parallel to each other, each of the transverse slots being capable of being passed through by the threaded pin of the first bar of the leg.

9. The box-type bed of embodiment 7, wherein the fixing plate has longitudinal slots parallel to each other, for fixing the bracket to the leg of the headboard frame by means of screws.

10. The box-type bed of embodiment 7, wherein the base has a first side tab, the fixing plate has a second side tab, the second side tab being a continuation of the first side flap.

LIST OF REFERENCE NUMERALS

1—box-type bed
2—bed frame 2

3, 4—side rails
5—headboard rail (end rail)
6—footboard rail (end rail)
7—center rail
8—headboard
9—protective cover
10—bed leg
11 (11$x$, 11$y$, 11$z$)—bars
12 (12$x$, 12$z$)—threaded pin
13—adjustable shoe
14, 15—through holes
16, 18—wing nuts
17, 19—washers
20—coupling
21—conical pin
22—external thread
23—eyelet
24—plate
25—locking nut
26—inclined surface
27—screw
28—bracket
29—headboard frame
30—plate
31—leg
32—base
33—first side tab
34—fixing plate
35—second side tab
36, 37—(proximal, distal) transverse slots
38—reinforcement tab
39—longitudinal slot

The invention claimed is:

1. A mattress support assembly, comprising:

a rectangular frame having side rails and footboard and headboard rails;

a connector assembly in each corner of the frame internally connecting each side rail to the footboard rail and to the headboard rail, said connector assembly in turn comprising:

two plates from which alternately insertable eyelets project, each plate being fixed to a footboard rail/headboard rail or to a side rail by means of screws; and a conical pin that penetrates the inside of the alternately inserted eyelets, wherein the lower end of the conical pin has an external thread which receives a locking nut, wherein each of the plates has an inclined face having an angle of inclination of 45° in relation to a flat surface of the plate;

a leg disposed under each corner of the frame, each leg having three bars in a Cartesian arrangement, with an angle of 90° in the horizontal plane being defined between a first bar and a second bar, while a third bar projects in the orthogonal direction to the horizontal plane, each of the first bar and the second bar having a threaded pin, and each threaded pin projecting orthogonally in relation to the horizontal plane and in the opposite direction in relation to the third bar; and a reinforcement plate fixed to the first bar and the third bar, with a second reinforcement plate being fixed to the second bar and the third bar, each reinforcement plate having the shape of a right triangle, with the edge opposite the right angle having an arched shape, and wherein each of the first, second and third bars has a square cross-section.

2. The mattress support assembly of claim 1, wherein the lower end of the third bar further comprises a screw-adjustable shoe.

3. The mattress support assembly of claim 1, wherein each of the first, second and third bars and the reinforcement tabs are metal elements, a reinforcement tab being welded to the first bar and the third bar and another reinforcement bar being welded to the second bar and the third bar.

4. The mattress support assembly of claim 1, wherein each of the first and second bars has a length of at least 15 cm (5.91").

5. The mattress support assembly of claim 1, further comprising at least one center rail joining the central portion of the headboard rail and the central portion of the footboard rail, there being one leg on the joining of the center rail with the central portion of the headboard rail, and one leg on the joining of the center rail with the central portion of the footboard rail.

* * * * *